(12) United States Patent  
Eisenhour (10) Patent No.: US 9,027,358 B2  
(45) Date of Patent: May 12, 2015

(54) VEHICLE HEAT PUMP SYSTEM (75) Inventor: Ronald Eisenhour, West Bloomfield, MI (US)

(73) Assignee: Nissan North America, Inc., Franklin, TN (US)

( * ) Notice: Subject to any disclaimer, the term of this patent is extended or adjusted under 35 U.S.C. 154(b) by 504 days.

(21) Appl. No.: 13/405,810

(22) Filed: Feb. 27, 2012

(65) Prior Publication Data

US 2013/0219939 A1 Aug. 29, 2013

(51) Int. Cl.
F25B 13/00 (2006.01)
F25B 5/02 (2006.01)
F25B 6/02 (2006.01)
F25B 41/00 (2006.01)
B60H 1/00 (2006.01)

(52) U.S. Cl.
CPC ... *F25B 5/02* (2013.01); *F25B 6/02* (2013.01); *F25B 41/003* (2013.01); *F25B 2341/0661* (2013.01); *B60H 1/00921* (2013.01); *B60H 2001/00949* (2013.01)

(58) Field of Classification Search
CPC .............. B60H 1/00921; B60H 2001/00949; F25B 5/02; F25B 6/02; F25B 41/003; F25B 2341/0661
USPC ........ 62/149, 160, 174, 200, 203, 205, 324.1, 62/324.4
See application file for complete search history.

(56) References Cited

U.S. PATENT DOCUMENTS

| | | | |
|---|---|---|---|
| 5,301,515 A * | 4/1994 | Iritani et al. | 62/126 |
| 5,910,157 A | 6/1999 | Noda | |
| 6,230,505 B1 | 5/2001 | Noda et al. | |
| 2007/0283703 A1 * | 12/2007 | Heckt et al. | 62/3.61 |
| 2009/0113913 A1 | 5/2009 | Esaki | |
| 2011/0167849 A1 | 7/2011 | Kobayashi et al. | |
| 2012/0011869 A1 * | 1/2012 | Kondo et al. | 62/176.5 |

FOREIGN PATENT DOCUMENTS

| | | |
|---|---|---|
| JP | 2000-16073 | 1/2000 |
| JP | 2000-52755 | 2/2000 |

* cited by examiner

*Primary Examiner* — Marc Norman  
*Assistant Examiner* — Paolo Gonzalez  
(74) *Attorney, Agent, or Firm* — Global IP Counselors, LLP (57) ABSTRACT A vehicle heat pump system includes a compressor, a first valve coupled to an outlet of the compressor, a cooling circuit between the first valve and the inlet of the compressor, a heating circuit between the first valve and the inlet of the compressor and a controller. The heating circuit includes a heating circuit evaporator and a second valve between the heating circuit evaporator and the inlet of the compressor. The controller is configured to operate the first valve to switch between a cooling mode and a heating mode, cycle the second valve opened and closed in the heating mode, such that when closed, the compressor draws refrigerant out of the cooling circuit and refrigerant pressure builds up within the heating circuit, and maintain the second valve open upon the controller determining that sufficient refrigerant has been drawn out of the cooling circuit during the cycling of the second valve.

19 Claims, 6 Drawing Sheets

VEHICLE HEAT PUMP SYSTEM

BACKGROUND

1. Field of the Invention

The present invention generally relates to a vehicle heat pump system. More specifically, the present invention relates to a vehicle heat pump system that captures heat from air exhausting from the passenger compartment of the vehicle when operating in a heating mode.

2. Background Information

A vehicle typically includes both an air conditioning system and heating system in order to provide comfortable conditions within a passenger compartment of the vehicle. However in electric vehicles, there is no internal combustion engine and hence no source of disposable heat that can be used to heat the passenger compartment. Similarly, in some hybrid vehicles, an internal combustion engine may be so small that it may fail to provide adequate amounts of disposable heat to heat the passenger compartment or may not operate long enough to achieve a temperature where disposable heat is produced for heating the passenger compartment.

Heat pump systems have been proposed for electric vehicles and hybrid vehicles. However these systems are overly complex and include exposing segments of a heating circuit to ambient conditions outside the passenger compartment resulting in loss of heat that could otherwise be used to heat the passenger compartment.

SUMMARY

One object is to provide a vehicle with a heat pump system that provides heat to the passenger compartment in a manner that minimizes energy consumption.

Another object is to provide a vehicle with a heat pump system that provides heat to the passenger compartment by reclaiming heat in airflow exhausting the passenger compartment.

Still another object is to provide a vehicle with a heat pump system that evacuates refrigerant from a cooling circuit of the heat pump system when operating in a heating mode.

In view of the state of the known technology, one aspect of the present disclosure is to provide a vehicle heat pump system with a compressor, a first valve, a cooling circuit, a heating circuit and a controller. The compressor includes an inlet side and an outlet side. The first valve is fluidly coupled to the outlet side of the compressor to receive compressed refrigerant exiting the outlet side of the compressor. The cooling circuit is fluidly coupled between the first valve and the inlet side of the compressor. The heating circuit is fluidly coupled between the first valve and the inlet side of the compressor. The heating circuit also includes an evaporator and a second valve located between the evaporator and the inlet side of the compressor. The controller is operatively coupled to the first and second valves. The controller controls the first and second valves. Specifically, the controller operates the first valve to block refrigerant flow to the heating circuit and direct refrigerant flow to the cooling circuit to establish a cooling mode. The controller also operates the first valve to block refrigerant flow to the cooling circuit and direct refrigerant flow to the heating circuit to establish a heating mode. The controller further operates the second valve by cycling the second valve between an open state where refrigerant flows from the heating circuit to the inlet side of the compressor and a closed state where the second valve blocks refrigerant flow from the heating circuit to the inlet side of the compressor while the first valve is operated to establish the heating mode. Consequently, with the second valve in the closed state the compressor draws refrigerant out of the cooling circuit and refrigerant pressure builds up within the heating circuit. Further, the controller maintains the second valve in the open state upon the controller determining that sufficient refrigerant has been drawn out of the cooling circuit during the cycling of the second valve.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
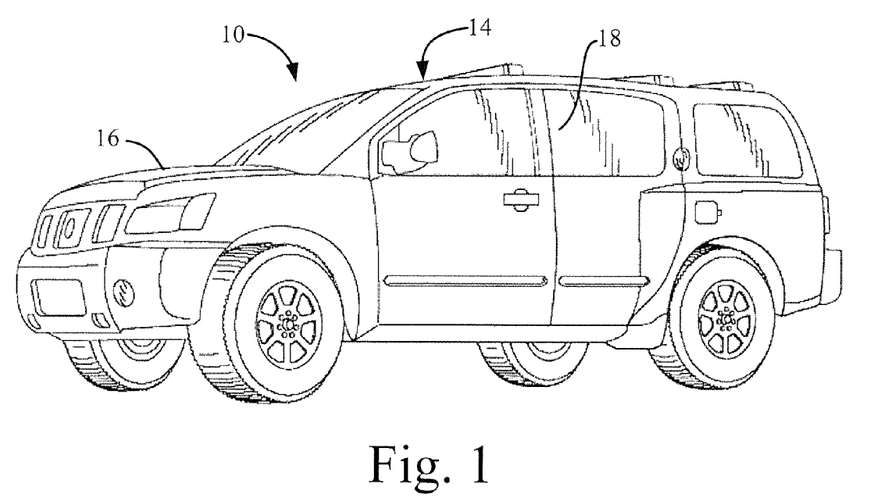
FIG. 1 is a perspective view of a vehicle that includes a heat pump system in accordance with a first embodiment.
Figure 2:
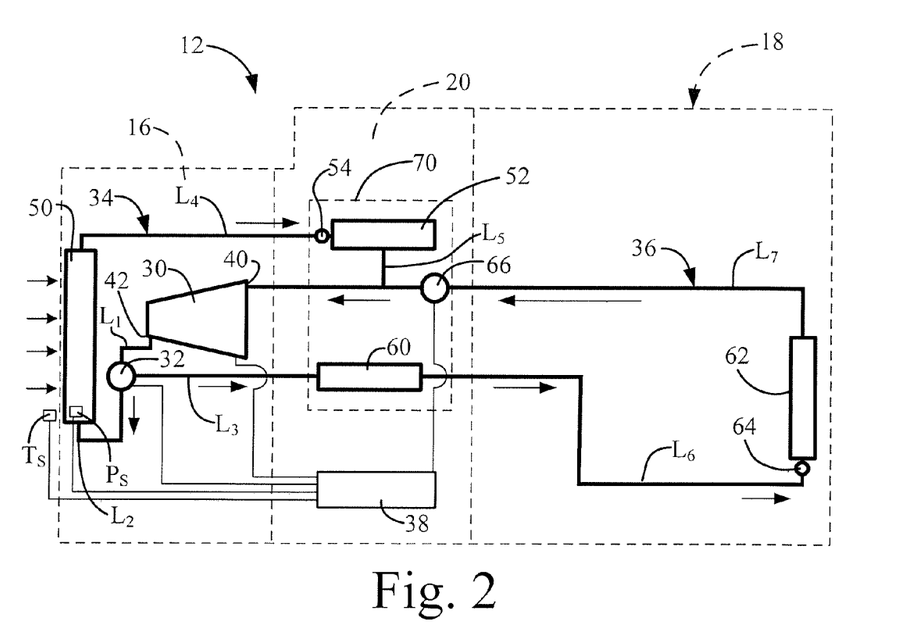
FIG. 2 is a schematic view of the heat pump system that includes a heating circuit, a cooling circuit and a first valve that switches operation of the heat pump between operation in a cooling mode and operation in a heating mode, the drawing further showing various locations of the components of the heat pump system within the vehicle in accordance with the first embodiment.

Referring initially to FIG. 1, a vehicle 10 is illustrated in accordance with a first embodiment. As shown in FIG. 2, the vehicle 10 includes a heat pump system 12 that is described in greater detail below.

Referring again to FIG. 1, the vehicle 10 includes a vehicle structure 14 that defines a front section that includes an engine compartment 16 and mid-to-rearward section that includes a passenger compartment 18. Although not shown, the vehicle 10 can include an internal combustion engine, a hybrid power system with both an internal combustion engine and an electric motor, or just an electric motor with batteries that supplies all power to the vehicle 10. More specifically, the heat pump system 12 can be used with any of a variety of vehicular configurations.

As shown schematically in FIG. 2, the passenger compartment 18 includes a utility area 20 that is preferably located beneath an instrument panel or dashboard area of the passenger compartment 18. It should be understood from the drawings and description herein that the utility area 20 can be located completely within the passenger compartment 18 or may extend partially into the engine compartment 16. However, the portion of the utility area 20 that houses a heating circuit (described in greater detail below) of the heat pump system 12 is preferably isolated from the engine compartment 16. In particular, those elements that make up the heating circuit are preferably isolated from ambient conditions in order to minimize loss of heat processed by the heating circuit when the heat pump system 12 is operating in a heating mode. Since the passenger compartment 18 and the utility area 20 of the passenger compartment 18 of the vehicle 10 are conventional features of vehicles, further description is omitted for the sake of brevity.

Figure 3:
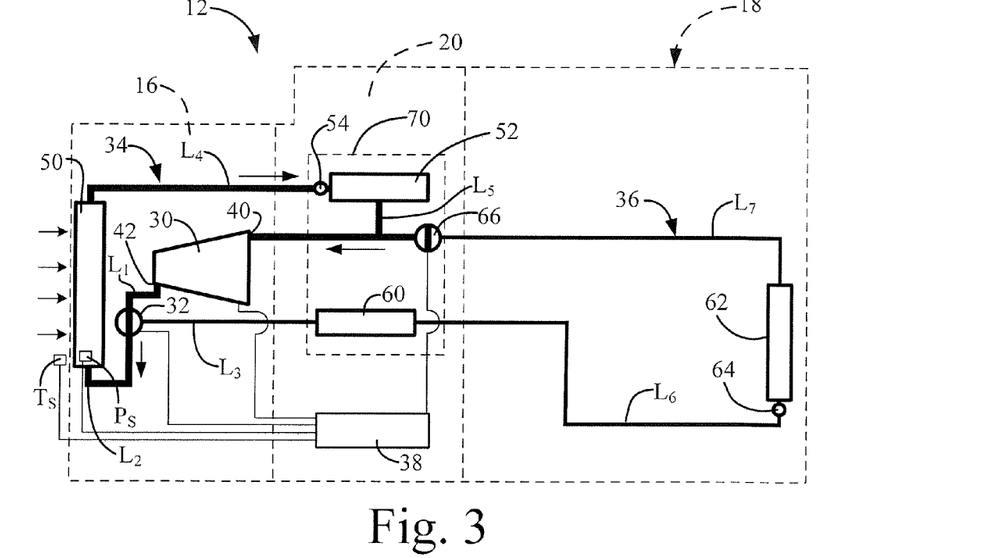
FIG. 3 is another schematic view of the heat pump system similar to FIG. 2, showing the first valve set to a cooling mode position and further showing an indication of the flow of refrigerant through the cooling circuit with the heap pump system operating in the cooling mode in accordance with the first embodiment.
Figure 4:
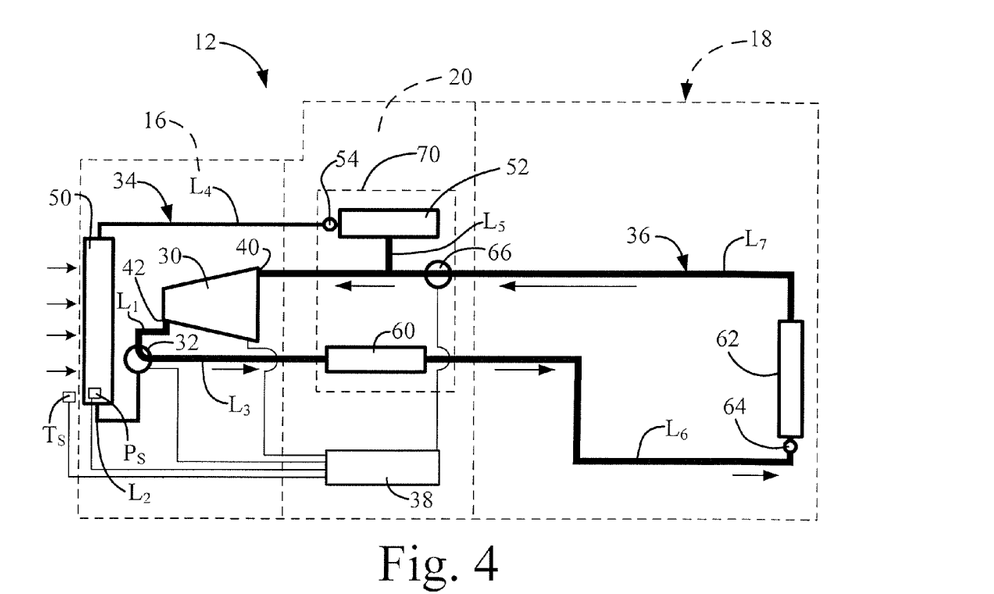
FIG. 4 is another schematic view of the heat pump system similar to FIGS. 2 and 3, showing the first valve set to a heating mode position and further showing an indication of the flow of refrigerant through the heating circuit with the heap pump system operating in the heating mode in accordance with the first embodiment.

A description of the heat pump system 12 is now provided with initial reference to FIGS. 2, 3 and 4. The heat pump system 12 basically includes a compressor 30, a first valve 32, a cooling circuit 34, a heating circuit 36 and a controller 38.

The compressor 30 can be powered by, for example, an engine (not shown) within the vehicle or an electric motor. The compressor 30 includes an inlet side 40 and an outlet side 42. The compressor 30 can be any of a variety of types of compressors. For example, the compressor 30 can include a clutch mechanism (not shown) that is controlled by the controller 38, such that the controller 38 manages operation of the compressor by cycling the clutch between an engaged orientation (compressor on) and a dis-engaged orientation (compressor off). Hence, with this compressor configuration, the controller 38 manages operation of the compressor 30 by cycling the clutch mechanism of the compressor 30 on and off during heat pump operation.

Alternatively, the compressor 30 can include an internal variable output control mechanism connected to the controller 38. In this alternative compressor configuration, the compressor 30 includes a main shaft that rotates continuously during operation of the heat pump system 12. The controller 38 manages operation of the compressor 30 by adjusting the internal variable control mechanism to change, for example, the overall outputted refrigerant pressure exiting the outlet side 42 of the compressor 30. In other words, the compressor 30 in this alternate configuration is operated continuously, and is not cycled on and off. Rather, the compressed refrigerant output of the compressor 30 is adjusted. Specifically, the compressor 30 is operated to provide an adjustable compressed refrigerant output, where the output is adjustable between a high pressure output and a lowered pressure output, where the lowered pressure output still provides compressed refrigerant to the evaporator 28, but at reduced levels.

The first valve 32 is fluidly coupled to the outlet side 42 of the compressor 30 by refrigerant line $L_1$. More specifically, the refrigerant line $L_1$ fluidly connects the outlet side 42 of the compressor 30 to the first valve 32. The first valve 32 receives compressed refrigerant exiting the outlet side 42 of the compressor 30 and is configured to switch direction of flow of compressed refrigerant exiting the compressor 30 between the cooling circuit 34 and the heating circuit 36. The first valve 32 is fluidly connected to a refrigerant line $L_2$ and a refrigerant line $L_3$. The refrigerant line $L_2$ is further fluidly connected to the cooling circuit 34 and the refrigerant line $L_3$ is further fluidly connected to the heating circuit 36. Operation of the first valve 32 is controlled by the controller 38 in a manner described below.

Hence, the first valve 32 provides a way for controller 38 of the heat pump system 12 to switch between a heating mode and a cooling mode. FIG. 3 is a schematic drawing of the heat pump system 12, showing the first valve 32 in a position that enables the cooling mode. In FIG. 3, the refrigerant lines $L_1$, $L_2$, $L_4$ and $L_5$ that at least partially define the cooling circuit 34, are shown with lines that are thicker than the refrigerant lines that at least partially define the heating circuit 36 to provide a clearer visual indication of the cooling circuit 34 in the cooling mode. FIG. 4 is a schematic drawing of the heat pump system 12, showing the first valve 32 in a position that enables the heating mode. In FIG. 4, the refrigerant lines $L_1$, $L_3$, $L_6$ and $L_7$ that at least partially define the heating circuit 36 are shown with lines that are thicker than the refrigerant lines that at least partially define the cooling circuit 34 to provide a clearer visual indication of the heating circuit 36 in the heating mode.

In the cooling mode (shown in FIG. 3), heat is removed from the passenger compartment 18 by the cooling circuit 34 in a conventional manner that is described in greater detail below. In the heating mode (shown in FIG. 4), heat is provided to the passenger compartment 18 by the heating circuit 36 in a manner described in greater detail below.

A description of the cooling circuit 34 is now provided with specific reference to FIGS. 2 and 3. The cooling circuit 34 is fluidly coupled between the first valve 32 and the inlet side 40 of the compressor 30 to provide cooling to the passenger compartment 18 of the vehicle 10. The cooling circuit 34 includes a first condenser 50 and a first evaporator 52. The refrigerant line $L_2$ fluidly connects the first valve 32 to the first condenser 50. A refrigerant line $L_4$ fluidly connects the first condenser 50 to the first evaporator 52. An expansion valve 54 can be included as a part of the first evaporator 52, or can be located within the refrigerant line $L_4$ to regulate refrigerant pressure within the first evaporator 52 in a conventional manner. A refrigerant line $L_5$ fluidly couples the first evaporator 52 to the inlet side 40 of the compressor 30.

The first condenser 50 is located within the vehicle structure 14 but is positioned outside of the passenger compartment 18. More specifically, the first condenser 50 (an air conditioning condenser) can be located within the engine compartment 16 in a conventional location at the front of the vehicle 10 where heat is readily released. The first evaporator 52 is located within the passenger compartment 18, and is further preferably located under the dashboard in the utility area 20 of the passenger compartment 18. A further description of the first evaporator 52 is provided below, after a description of the heating circuit 36.

With the heat pump system 12 operating in the cooling mode, the cooling circuit 34 operates in a conventional manner. Compressed refrigerant is directed through the refrigerant line $L_1$ from the outlet side 42 of the compressor 30 to first valve 32. The first valve 32 then directs the compressed refrigerant through the refrigerant line $L_2$ to the first condenser 50 where ambient air flows across surfaces of the first condenser 50 causing heat to dissipate. The cooled compressed refrigerant then flows through the refrigerant line $L_4$ from the first condenser 50 to expansion valve 54 which allows the compressed refrigerant to expand such that low pressure refrigerant enters the first evaporator 52. Heat is absorbed by low pressure refrigerant in the first evaporator 52, thereby cooling the passenger compartment 18. Low pressure refrigerant is then directed by the refrigerant line $L_5$ from the first evaporator 52 to the inlet side 40 of the compressor 30.

A description of the heating circuit 36 is now provided with specific reference to FIGS. 2 and 4. The heating circuit 36 is fluidly coupled between the first valve 32 and the inlet side 40 of the compressor 30 to provide heat to the passenger compartment 18 of the vehicle 10. The heating circuit 36 includes a second condenser 60 and a second evaporator 62. The refrigerant line $L_3$ fluidly connects the first valve 32 to the second condenser 60. A refrigerant line $L_6$ fluidly connects the second condenser 60 to the second evaporator 62. An expansion valve 64 can be included as a part of the second evaporator 62, or can be located within the refrigerant line $L_6$ to control refrigerant pressure within the second evaporator 62. A refrigerant line $L_7$ fluidly couples the second evaporator 62 to the inlet side 40 of the compressor 30. As shown in FIGS. 2-4, the refrigerant line $L_5$ is fluidly connected to the refrigerant line $L_7$. The refrigerant line $L_7$ is fluidly connected to the inlet side 40 of the compressor 30 thereby also fluidly connecting the refrigerant line $L_5$ to the inlet 40 of the compressor 30.

The second condenser 60 is located within the passenger compartment 18, and is further preferably located under the dashboard in the utility area 20 of the passenger compartment 18. The second evaporator 62 is preferably positioned at a rearward section of the passenger compartment 18 at a location where air exhausts from the passenger compartment 18 and further exits the vehicle 10. More specifically, the second evaporator 62 is positioned to absorb heat from airflow exhausting from the passenger compartment 18. Therefore, at least a portion of heat contained within the air exiting the passenger compartment 18 (and exiting the vehicle 10) can be recaptured by the second evaporator 62. The second condenser 60 and the second evaporator 62 of the heating circuit 36 are both positioned within the passenger compartment 18.

The heating circuit 36 further includes a second valve 66 located at the refrigerant line $L_7$ between the second evaporator 62 and the inlet side 40 of the compressor 30. More specifically, the second valve 66 is operable to selectively block flow of refrigerant from the second evaporator 62 to the inlet side 40 of the compressor 30, as is explained in greater detail below.

With the heat pump system 12 operating in the heating mode, the heating circuit 36 operates in the following manner. Compressed refrigerant is directed through the refrigerant line $L_1$ from the outlet side 42 of the compressor 30 to first valve 32. The first valve 32 then directs the compressed refrigerant through the refrigerant line $L_3$ to the second condenser 60 within the passenger compartment 18 of the vehicle. Air flowing into or recirculating from the passenger compartment 18 flows across surfaces of the second condenser 60 absorbing heat that is then provided to the passenger compartment 18. The compressed refrigerant within the second condenser 60 is cooled by this airflow. The cooled compressed refrigerant then flows through the refrigerant line $L_6$ from the second condenser 60 to expansion valve 64 which allows the compressed refrigerant to expand such that low pressure refrigerant enters the second evaporator 62. Heat contained within air exhausting from the passenger compartment 18 is then absorbed by low pressure refrigerant in the second evaporator 62, thereby reclaiming heat otherwise lost from the passenger compartment 18. Low pressure refrigerant is then directed by the refrigerant line $L_7$ from the second evaporator 62 to the inlet side 40 of the compressor 30.

Figure 5:
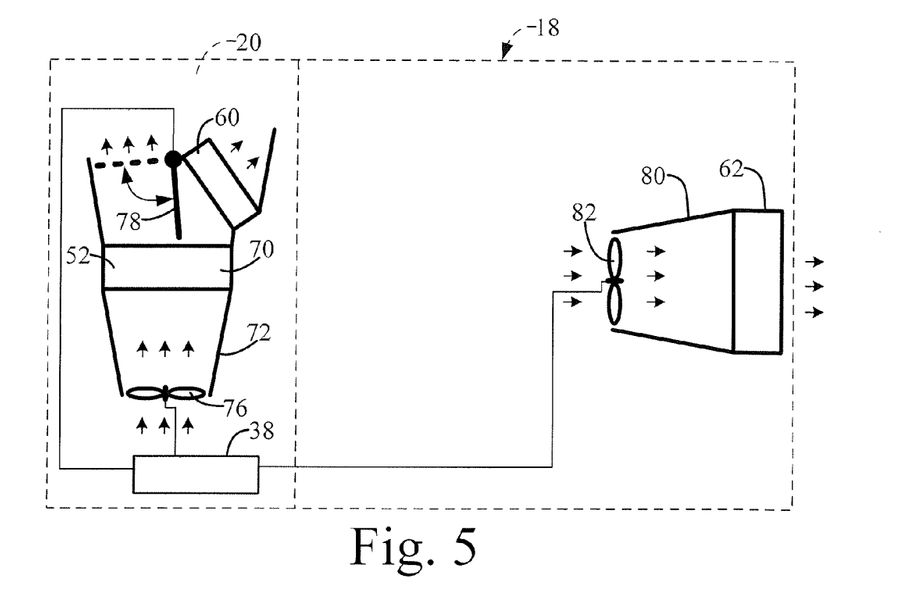
FIG. 5 is a schematic view of a passenger compartment of the vehicle showing an evaporator of the heating circuit and an evaporator of the cooling circuit and respective blower motors of each in accordance with the first embodiment.

As shown schematically in FIGS. 2, 3 and 4, the utility area 20 of the passenger compartment 18 includes an air handler 70. The air handler 70 is also shown schematically in FIG. 5 along with the second evaporator 62 within the passenger compartment 18. Specifically, the air handler 70 is disposed within the utility area 20 under the dashboard of the vehicle 10. As shown in FIG. 5, the air handler 70 is connected to a conventional air inlet 72 that directs fresh air into the air handler 70 or directs recirculated air from the passenger compartment 18 into the air handler 70. The air handler 70 also includes conventional duct work (not shown) that directs airflow into the passenger compartment 18. The air handler 70 also includes a blower motor 76 and an air blend door 78.

The blower motor 76 is a conventional, variable speed blower motor that selectively forces air to flow across heat exchanging surfaces of the first evaporator 52 and/or the second condenser 60. The air blend door 78 is moveable between a plurality of positions, such as a position that blocks the flow of air to the second condenser 60 or a position that diverts all air flowing through the air handler 70 to flow across the heat exchanging surfaces of the second condenser 60. The air blend door 78 can also be positioned to a plurality of intermediate positions therebetween.

In the configuration depicted in FIG. 5, air always flows across the heat exchanging surfaces of the first evaporator 52. However, it should be understood from the drawings and the description herein that the air handler 70, the first evaporator 52, the second condenser 60 and the air blend door 78 can be re-positioned relative to one another such that the air blend door 78 allows air to flow across the heat exchanging surfaces of only one of the first evaporator 52 and the second condenser 60 at any given time. For example, although not depicted, the air handler 70 and air blend door 78 can be arranged such that in the heating mode air can be directed to flow only across heat exchanging surfaces of the first evaporator 52. Similarly, the air handler 70 and air blend door 78 can be arranged such that in the cooling mode air can be directed to flow only across heat exchanging surfaces of the second condenser 60. In other words, the configuration of the air handler 70 depicted in the drawings can be modified and the components re-arranged depending on the requirements of the vehicle 10 and design considerations of the passenger compartment 18.

As is also shown in FIG. 5, the second evaporator 62 is provided with an air handler 80 that includes a blower motor 82. The air handler 80 is shaped and configured to direct air exhausting from the passenger compartment 18 to flow across the heat exchanging surfaces of the second evaporator 62. The blower motor 82 is disposed relative to the air handler 80 to provide a means for controlling the volume of air flowing through the air handler 80 and across the heat exchanging surfaces of the second evaporator 62.

For example, in the cooling mode, operation of the blower motor 82 may not be necessary, and hence the blower motor 82 can be shut off in the cooling mode. However, in the heating mode, in order to maximize the amount of heat recaptured from the air exhausting the passenger compartment 18, operation of the blower motor 82 at a controlled speed or speeds can be beneficial.

Operation of the blower motor 76, the air blend door 78 and the blower motor 82 can be controlled by the controller 38. In other words, in the depicted embodiment, the blower motor 76, the air blend door 78 and the blower motor 82 are all connected to the controller 38. Hence, the controller 38 can selectively control the speed of the blower motor 76 and the blower motor 82, depending upon the operating mode of the heat pump system 12 and ambient conditions outside of the vehicle 10. Further, the controller 38 can selectively control the position of the air blend door 78.

As shown in FIGS. 2-5, the first evaporator 52 of the cooling circuit 34, the second condenser 60 and the second evaporator 62 of the heating circuit 36 are all positioned within the passenger compartment 18. With the second condenser 60 and the second evaporator 62 of the heating circuit 36 being positioned within the passenger compartment 18, the heating circuit 36 is essentially protected from ambient temperature and weather conditions (conditions outside the vehicle 10). Hence, once the heat pump system 12 is operating in the heating mode, heat losses to outside weather conditions are minimized. Only the compressor 30, the first valve 32 and short segments of the refrigerant line $L_3$ and the refrigerant line $L_7$ are located outside of the passenger compartment 18. Therefore, when the heat pump system 12 is operating in extremely cold weather, heat losses from the heating circuit 36 are minimized.

A description of the controller 38 is now provided with reference to FIGS. 2-6. As shown in FIGS. 2-4, the controller 38 is electronically connected to (or coupled to) the compressor 30, the first valve 32 and the second valve 66. Additionally, the controller 38 is connected to a temperature sensor $T_S$ located adjacent to or on the first condenser 50 and a pressure sensor $P_S$ located on or within the first condenser 50 (the air conditioning condenser). Further, as shown in FIG. 5, the controller 38 is also electronically connected to the blower motor 76, the air blend door 78 and the blower motor 82. Hence, the controller 38 can control operation of each of the compressor 30, the first valve 32, the second valve 66, the blower motor 76, the air blend door 78 and the blower motor 82.

Alternatively, it is also possible for the controller 38 to be connected to and control operation of the expansion valve 54 and the expansion valve 64. However, in the depicted embodiment, the expansion valve 54 and the expansion valve 64 are automatic expansion devices, such as conventional refrigerant nozzles that allow for gradual expansion of high pressure refrigerant to a lower pressure environment.

It should further be understood that the inlet side 40 of the compressor 30 can include a pressure sensor (not shown) that is also connected to the controller 38. Hence, the controller 38 can monitor the refrigerant pressure at the inlet side 40 of the compressor 30 and can further monitor the temperature and pressure at the first condenser 50 using readings from the temperature sensor $T_S$ and the pressure sensor $P_S$.

Basically, the controller 38 is primarily configured to operate the first valve 32 and the second valve 66. Specifically, the controller 38 operates the first valve 32 to block refrigerant flow to the heating circuit 36 and direct refrigerant flow to the cooling circuit 34 to establish the cooling mode. Further, the controller 38 operates the first valve 32 to block refrigerant flow to the cooling circuit 34 and direct refrigerant flow to the heating circuit 36 to establish a heating mode.

When the first valve 32 is set to establish the heating mode, the controller 38 also cycles the second valve 66 between an open state and a closed state. When the second valve 66 is in the open state, refrigerant can flow from the heating circuit 36 to the inlet side 40 of the compressor 30. When the second valve 66 is in the closed state (in the heating mode), the second valve 66 blocks refrigerant flow from the heating circuit 36 to the inlet side 40 of the compressor 30 such that the compressor 30 draws refrigerant out of the cooling circuit 34. At this time, refrigerant pressure can build up within the heating circuit 36. Once the controller 38 determines that sufficient amounts of refrigerant have been drawn out of the cooling circuit 34, the controller 38 operates the second valve 66 to put it in the open state. Thereafter, the controller 38 can additionally throttle and/or periodically close the second valve 66 in order to maintain the temperature of the evaporator 62 at or above 0° C. in order to avoid ice formation on surfaces of the evaporator 62, depending upon ambient conditions outside the vehicle 10.

During operation of the heat pump system 12 in the cooling mode, the cooling circuit 34 can accumulate an appreciable amount of refrigerant in a liquid state, for instance, within the first condenser 50. If heating is now required, it can be assumed that the refrigerant in the cooling circuit 34 is exposed to cold ambient conditions outside the vehicle 10. The cold conditions are such that liquid refrigerant within the first condenser 50 will remain in the first condenser 50 even after switching to the heating mode. When the heat pump system 12 is switched from the cooling mode to the heating mode, the heating circuit 36 may not operate with optimal efficiency with an appreciable amount of refrigerant (cold refrigerant) remaining in the cooling circuit 34. Specifically, it may be difficult for the heating circuit 36 to achieve the high refrigerant pressures necessary to provide adequate heat to the passenger compartment 18. Further, the cold conditions that the first condenser 50 will likely be exposed to with the heat pump system 12 operating in the heating mode, may cause refrigerant to further condense, thus further reducing the efficiency and effectiveness of the heating mode.

In order to improve operating efficiency of the heating circuit 36 and build up the high pressures and high temperatures in the heating circuit 36 necessary to provide heat to the passenger compartment 18, it is advantageous to remove appreciable amounts of refrigerant from the cooling circuit 34 as quickly as possible. Therefore, when the heating mode is first implemented by the controller 38, the first valve 32 is set to the heating mode position and the second valve 66 is closed so that the compressor 30 can draw refrigerant out of the cooling circuit 34. Therefore, refrigerant pressure can build up in the heating circuit 36. Thereafter, the second valve 66 can be opened to allow the heating mode to continue. Occasionally, refrigerant may migrate to the cooling circuit 34 while the heat pump system 12 is operating in the heating mode. When this occurs, the controller 38 can close the second valve 66 forcing the compressor 30 to draw the migrating refrigerant back in to the heating circuit 36.

Figure 6:
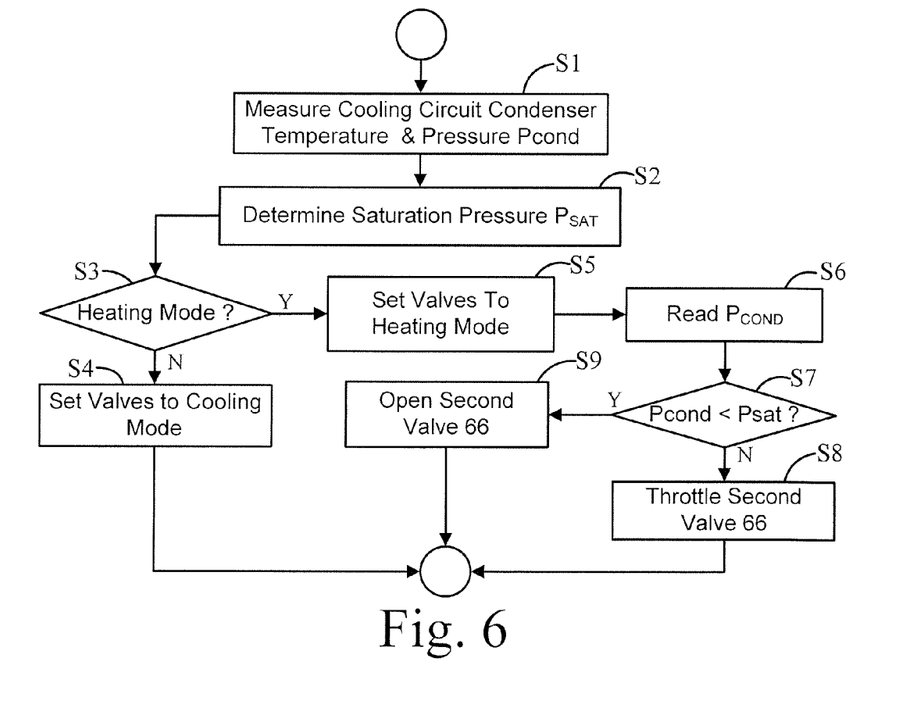
FIG. 6 is a flowchart showing operational steps performed by a controller of the heat pump system in accordance with the first embodiment.

FIG. 6 is a flowchart showing one example of control logic implemented by the controller 38 to control the heat pump system 12. Specifically, at step S1, the controller 38 reads the temperature at the first condenser 50 and pressure of the refrigerant within the first condenser 50 from the temperature sensor $T_S$ and the pressure sensor $P_S$. At step S2, the controller 38 then determines the saturation pressure $P_{SAT}$ of the refrigerant within the first condenser 50 based upon the measured temperature and pressure from the temperature sensor $T_S$ and the pressure sensor $P_S$. Since the saturation pressure $P_{SAT}$ of refrigerant at a specific temperature and pressure is well known and can be determined using any of a variety of well-known Thermodynamics textbook reference tables, further description of the step of obtaining the saturation pressure $P_{SAT}$ of the refrigerant within the first condenser 50 is omitted for the sake of brevity.

At step S3 in FIG. 6, the controller 38 determines whether or not the heat mode has been requested by an occupant of the vehicle 10. If the heat mode has not been requested, then operation moves to step S4. If the heat mode has been requested, operation moves to step S5. At step S4, the controller 38 sets the first and second valves 32 and 66 for operation in the cooling mode. Specifically, the controller 38 sets the first valve 32 to direct compressed refrigerant to flow from the outlet side 42 of the compressor 30 to the first condenser 50 of the cooling circuit 34 and blocks compressed refrigerant from flowing into the second condenser 60, as shown in FIG. 3. At step S4, the controller 38 can close the second valve 66, effectively sealing off the heating circuit 36 from the cooling circuit 34, as is also shown in FIG. 3. Alternatively, the controller 38 can leave the second valve 66 open in the cooling mode (not shown in FIG. 3). Specifically, since the evaporator 62 is located within the passenger compartment 18 of the vehicle 10, the overall temperature of the evaporator 62 will be high enough in the cooling mode such that refrigerant within the evaporator 62 should migrate to the cooling circuit 34 and not interfere with operation of the cooling circuit 34 in the cooling mode. Further, the controller 38 can also be programmed to open the second valve 66 temporarily in an initial interval of the cooling mode to allow refrigerant to migrate from the heating circuit 36 into the cooling circuit 34 and then close. The state of the second valve 66 in the cooling mode is dependent upon design factors related to the vehicle 10. Therefore, the actual state of the second valve 66 in the cooling mode may differ from vehicle to vehicle. Since operation in the cooling mode includes conventional operation of the compressor 30, further description of the cooling mode is omitted for the sake of brevity.

At step S5, the controller 38 sets the first and second valves 32 and 66 for operation in the heating mode. Specifically, the controller 38 sets the first valve 32 to direct flow of compressed refrigerant from the outlet side 42 of the compressor 30 to the second condenser 60 of the heating circuit 36 and blocks compressed refrigerant from flowing into the first condenser 50, as shown in FIG. 4. At step S5, the controller 38 also closes the second valve 66, temporarily sealing off the heating circuit 36 from the cooling circuit 34, as shown in FIG. 4. At this time, refrigerant within the cooling circuit 34 is drawn out of the cooling circuit 34 by the compressor 30, while refrigerant pressure builds up in the heating circuit 36.

At step S6, the controller 38 reads the current refrigerant pressure $P_{COND}$ as currently measured by the pressure sensor $P_S$ in the first condenser 50. At step S7, the controller 38 determines whether or not the refrigerant pressure $P_{COND}$ is less than the saturation pressure $P_{SAT}$ determined in step S2.

If the measured refrigerant pressure $P_{COND}$ in the first condenser 50 is not less than the determined saturation pressure $P_{SAT}$, it is an indication that there is likely at least some liquid refrigerant contained within the first condenser 50 that needs to be evacuated. If the measured refrigerant pressure $P_{COND}$ in the first condenser 50 is less than the determined saturation pressure $P_{SAT}$, it is an indication that most, if not all liquid refrigerant has been evacuated from the first condenser 50.

It is important to remove as much refrigerant from the first condenser 50 as possible in order to increase the efficiency of operation of the heat pump system 12 in the heating mode. First, if the heat pump system 12 is operating in the heating mode, it is likely that ambient conditions outside the vehicle 10 are such that the first condenser 50 is being exposed to cold air, possibly below 0° C. Any refrigerant remaining in the first condenser 50 is exposed to this cold air and will cause refrigerant to condense within the first condenser 50 even though compressed refrigerant is no longer being directed into the first condenser 50. If this cooled refrigerant is then compressed by the compressor 30 during the heating mode, the heat pump system 12 will have a difficult time producing the heat desired in the passenger compartment 18. Therefore, it is advantageous to draw as much refrigerant out of the cooling circuit 34 as possible at the beginning of operation in the heating mode, to increase overall efficiency of the heat pump system 12 while operating in the heating mode.

Further, in order to operate the heat pump system 12 in the heating mode and provide adequate heating to the passenger compartment 18, the refrigerant pressure within the second condenser 60 must be elevated to a level sufficient to expel required amounts of heat absorbed by the second evaporator 62 and energy added by the compressor 30. Therefore, when there are excessive amounts of refrigerant remaining in the cooling circuit 34, then there may be a deficiency in the amount of refrigerant in the heating circuit 36 and will make it difficult to achieve the high pressure refrigerant in the second condenser 60.

Hence, at step S7, if the controller 38 determines that the refrigerant pressure $P_{COND}$ is not less than the saturation pressure $P_{SAT}$ determined in step S2, operation moves to step S8. If the measured refrigerant pressure $P_{COND}$ in the first condenser 50 is less than the determined saturation pressure $P_{SAT}$, then operation moves to step S9.

As step S8, the second valve 66 is either closed or throttled to restrict or limit flow of refrigerant flowing from the second evaporator 62 and into the inlet side 40 of the compressor 30. When the flow of refrigerant from the second evaporator 62 is prevented or restricted by closing of the second valve 66 by the controller 38, the compressor 30 draws refrigerant out of the cooling circuit 34. Since the first valve 32 is set to block the flow of compressed refrigerant from the compressor 30 to the first condenser 50 and direct the flow of compressed refrigerant to the second condenser 60, refrigerant is effectively drawn out of the cooling circuit 34. At the same time, refrigerant pressure builds up in the heating circuit 36.

Eventually, the compressor 30 will draw enough of the refrigerant from the cooling circuit 34 to cause the measured refrigerant pressure $P_{COND}$ to drop below the determined saturation pressure $P_{SAT}$. Further, cycling of the controller 38 through the steps depicted in FIG. 6, will result in the controller 38 recognizing that the measured refrigerant pressure $P_{COND}$ in the first condenser 50 is less than the determined saturation pressure $P_{SAT}$, and operation will move to step S9.

At step S9, the controller opens the second valve 66 allowing the heating circuit 36 to operate in the heating mode such that at least a portion of heat exhausting the passenger compartment 18 is captured by heat exchange with the refrigerant in the second evaporator 62. Since the second evaporator 62 is maintained with a low operating refrigerant pressure, warmed refrigerant leaving the second evaporator 62 is then compressed by the compressor 30. Compressed refrigerant leaving the compressor 30 is then directed by the first valve 32 to the second condenser 60, where the heat is then directed back into the passenger compartment 18.

In the above described embodiment, the heating circuit 36 is entirely enclosed within the passenger compartment 18. Only the compressor 30, the first valve 32 and short segments of the refrigerant lines $L_1$, $L_3$ and $L_7$ are disposed within the engine compartment 16 and possibly exposed to ambient temperature conditions. Since the refrigerant lines $L_1$, $L_3$ and $L_7$ can be covered with insulation, the heating circuit 36 can maximize heat production efficiency by drawing from air exhausting from the passenger compartment 18. Consequently, the second evaporator 62 can be operated during the heating mode at temperatures slightly above 0° C., thereby increasing the potential heat reclamation from the exhausting air flow exiting the passenger compartment 18. By comparison, a heat pump system that attempts to draw heat from ambient air flow outside the passenger compartment 18 will have difficulty drawing heat out of cold air and will further be prone to ice formation. A layer of ice on a heat pump evaporator severely limits heat transferring potential. Hence, the above described embodiment of the heat pump system 12 has many advantages over conventional vehicle heat pump configurations.

Second Embodiment

Figure 7:
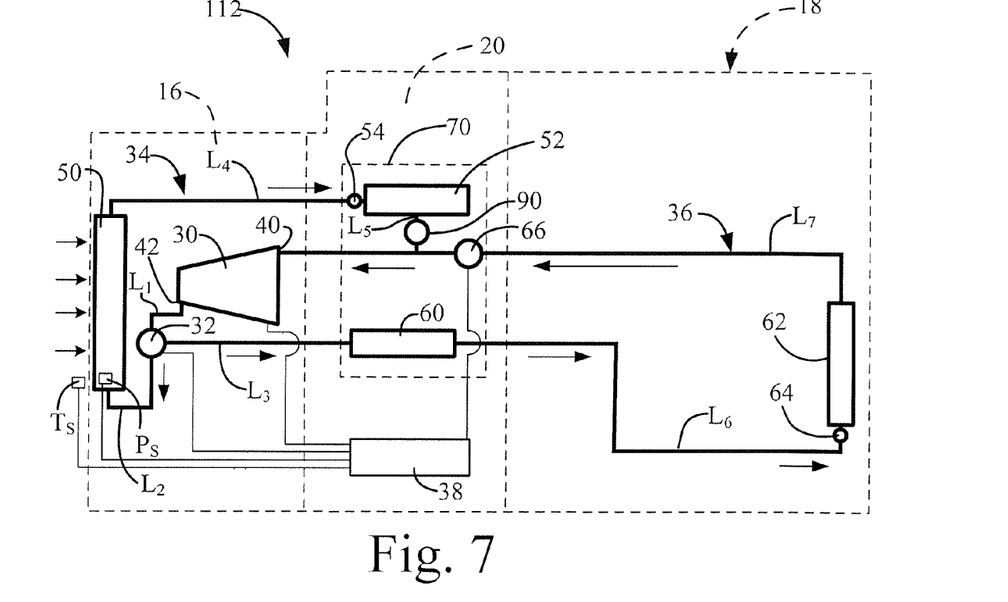
FIG. 7 is a schematic view of a heat pump system that includes a heating circuit and a cooling circuit showing the various locations of the components of the heat pump system within the vehicle in accordance with a second embodiment.
Figure 8:
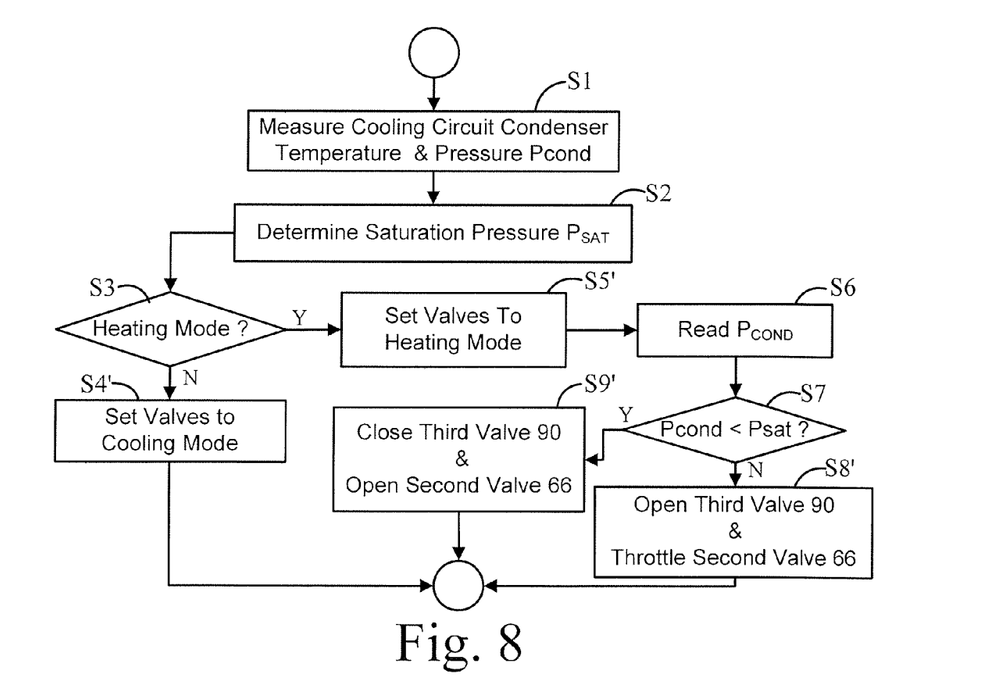
FIG. 8 is a flowchart showing operational steps performed by a controller of the heat pump system in accordance with the second embodiment.

Referring now to FIGS. 7 and 8, a heat pump system 112 in accordance with a second embodiment will now be explained. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity. The parts of the second embodiment that differ from the parts of the first embodiment will be indicated with a single prime (').

Many of the components of the first embodiment are included in the second embodiment. Specifically, the heat pump system 112 includes the compressor 30, the first valve 32, the cooling circuit 34, the heating circuit 36 and the controller 38 of the first embodiment. The cooling circuit 34 of the heat pump system 112 includes the first condenser 50, the first evaporator 52 and the expansion valve 54. As well, the heating circuit 36 of the heat pump system 112 includes the second condenser 60, the second evaporator 62 and the expansion valve 64.

However, the heat pump system 112 includes a third valve 90 located between second evaporator 52 and the inlet side 40 of the compressor 30. More specifically, the third valve 90 is installed in the refrigerant line $L_5$ downstream from the first evaporator 52 and upstream from the inlet side 40 of the compressor 30. The third valve 90 provides a means for sealing off the cooling circuit 34 from the heating circuit 36 after refrigerant has been drawn out of the cooling circuit 34 during initial operation in the heating mode. Alternatively, the function of third valve 90 (explained further below) can be performed by the expansion valve 54. Specifically, the expansion valve 54 can be operated along with the setting of the first valve 32 to selectively close off the first condenser 50 of the cooling circuit 34 from the heating circuit 36, thereby eliminating the third valve 90 to reduce the overall number of components in the heat pump system 112. However, as depicted in FIG. 7, the second embodiment includes the third valve 90.

In the second embodiment, the controller 38 includes operational steps that are similar to those set forth in FIG. 6, but include some modifications, as shown in FIG. 8 and as described below.

FIG. 8 is a flowchart showing one example of control logic implemented by the controller 38 to control the heat pump system 112. Specifically, at step S1, the controller 38 reads the temperature at the first condenser 50 and pressure of the refrigerant within the first condenser 50 from the temperature sensor $T_S$ and the pressure sensor $P_S$. At step S2, the controller 38 then determines the saturation pressure $P_{SAT}$ of the refrigerant within the first condenser 50 based upon the measured temperature and pressure from the temperature sensor $T_S$ and the pressure sensor $P_S$.

At step S3 in FIG. 8, the controller 38 determines whether or not the heat mode has been requested by an occupant of the vehicle 10. If the heat mode has not been requested, then operation moves to step S4'. If the heat mode has been requested, operation moves to step S5'. At step S4', the controller 38 sets the first, second and third valves 32, 66 and 90 for operation in the cooling mode. Specifically, the controller 38 sets the first valve 32 to direct compressed refrigerant to flow from the outlet side 42 of the compressor 30 to the first condenser 50 of the cooling circuit 34. At step S4', the controller 38 also closes the second valve 66, effectively sealing off the heating circuit 36 from the cooling circuit 34 and opens the third valve 90 or maintains the third valve 90 in an open position, if it is already open. The controller 38 can also be programmed to keep the second valve 66 open temporarily in an initial interval of the cooling mode to allow refrigerant to migrate from the heating circuit 36 into the cooling circuit 34. Since operation in the cooling mode includes conventional operation of the compressor 30, further description of the cooling mode is omitted for the sake of brevity.

At step S5', the controller 38 sets the first, second and third valves 32, 66 and 90 for operation in the heating mode. Specifically, the controller 38 sets the first valve 32 to direct flow of compressed refrigerant from the outlet side 42 of the compressor 30 to the second condenser 60 of the heating circuit 36 and blocks compressed refrigerant from flowing into the first condenser 50. At step S5', the controller 38 also closes the second valve 66, temporarily sealing off the heating circuit 36 from the cooling circuit 34 such that refrigerant within the cooling circuit 34 is drawn out of the cooling circuit 34 by the compressor 30, while pressure builds up in the heating circuit 36.

At step S6, the controller 38 reads the current refrigerant pressure $P_{COND}$ as currently measured by the pressure sensor $P_S$ in the first condenser 50. At step S7, the controller 38 determines whether or not the refrigerant pressure $P_{COND}$ is less than the saturation pressure $P_{SAT}$ determined in step S2.

At step S7, if the controller 38 determines that the refrigerant pressure $P_{COND}$ is not less than the saturation pressure $P_{SAT}$ determined in step S2, operation moves to step S8'. If the measured refrigerant pressure $P_{COND}$ in the first condenser 50 is less than the determined saturation pressure $P_{SAT}$, then operation moves to step S9'.

As step S8', the second valve 66 is either closed or throttled to restrict or limit flow of refrigerant flowing from the second evaporator 62 and into the inlet side 40 of the compressor 30. Further at step S8', the third valve 90 is opened or is maintained in an open orientation if already open thus permitting the compressor 30 to draw refrigerant out of the cooling circuit 34. When the flow of refrigerant from the second evaporator 62 is prevented or restricted by closing of the second valve 66 by the controller 38, the compressor 30 draws refrigerant out of the cooling circuit 34. The first valve 32 is set to block the flow of compressed refrigerant from the compressor 30 to the first condenser 50 and direct the flow of compressed refrigerant to the second condenser 60. Therefore, refrigerant is effectively drawn out of the cooling circuit 34. At the same time, refrigerant pressure builds up in the heating circuit 36.

At step S9', the controller 38 closes the third valve 90, isolating the cooling circuit 34 from the heating circuit 36 and the compressor 30. At step S9', the controller 38 also opens the second valve 66 allowing the heating circuit 36 to operate in the heating mode. Consequently, at least a portion of heat exhausting the passenger compartment 18 is captured by heat exchange with the refrigerant in the second evaporator 62.

Hence, in the second embodiment, the controller 38 is operatively coupled to the third valve 90 such that the controller 38 operates the third valve 90 to move temporarily to an open state where refrigerant flows from the cooling circuit 34 to the inlet side 40 of the compressor 30 while the first valve 90 is operated to establish the heating mode. At the same time, the second valve 66 is cycled between the open state and the closed state. The controller 38 also operates the third valve 90 such that the third valve 90 is in a closed state isolating the cooling circuit 34 from the heating circuit 36 while the second valve 66 is set to the open state upon the controller 38 determining that sufficient refrigerant has been drawn out of the cooling circuit 36 with the second valve 66 in the closed state.

In the configuration depicted in FIG. 7 of the second embodiment, it is possible to completely isolate the cooling circuit 34 from the heating circuit 36 with the heat pump system 112 operating in the heating mode. The isolation of the cooling circuit 34 from the heating circuit 36 makes it possible to elevate the inlet pressure at the compressor 30 significantly, enabling high compressor discharge temperatures, which enhance the heat output of the heat pump system 112 when operating in the heating mode.

In yet another alternative embodiment, the second valve 66 and the third valve 90 can be replaced with one single valve that operates in a manner consistent with the operation described above with respect to the second valve 66 and the third valve 90. Use of a single valve to replace the second valve 66 and the third valve 90, reduces the overall number of parts in the heat pump system 112.

Third Embodiment

Figure 9:
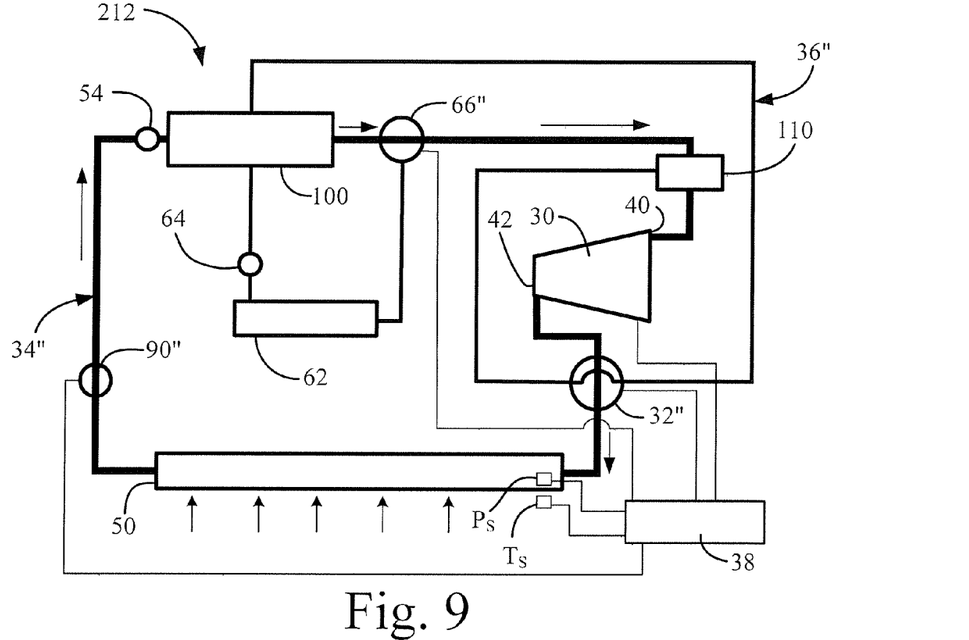
FIG. 9 is a schematic view of a heat pump system showing a first valve in a cooling mode position and further showing an indication of the flow of refrigerant through a cooling circuit of the heap pump system operating in the cooling mode in accordance with a third embodiment.
Figure 10:
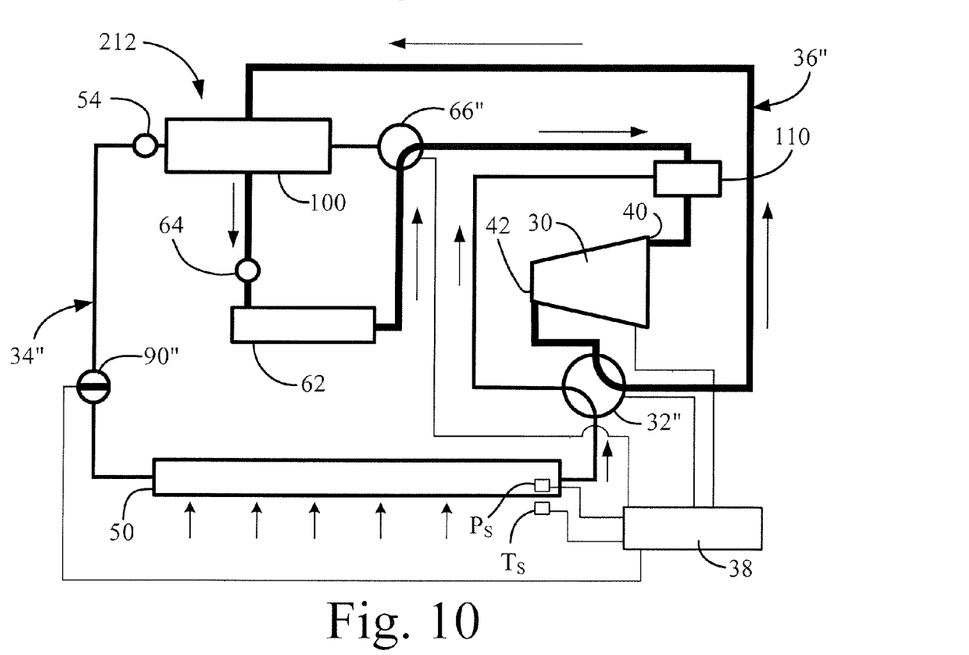
FIG. 10 is another schematic view of the heat pump system showing the first valve in a heating mode position and further showing an indication of the flow of refrigerant through a heating circuit with the heap pump system operating in the heating mode in accordance with the third embodiment.
Figure 11:
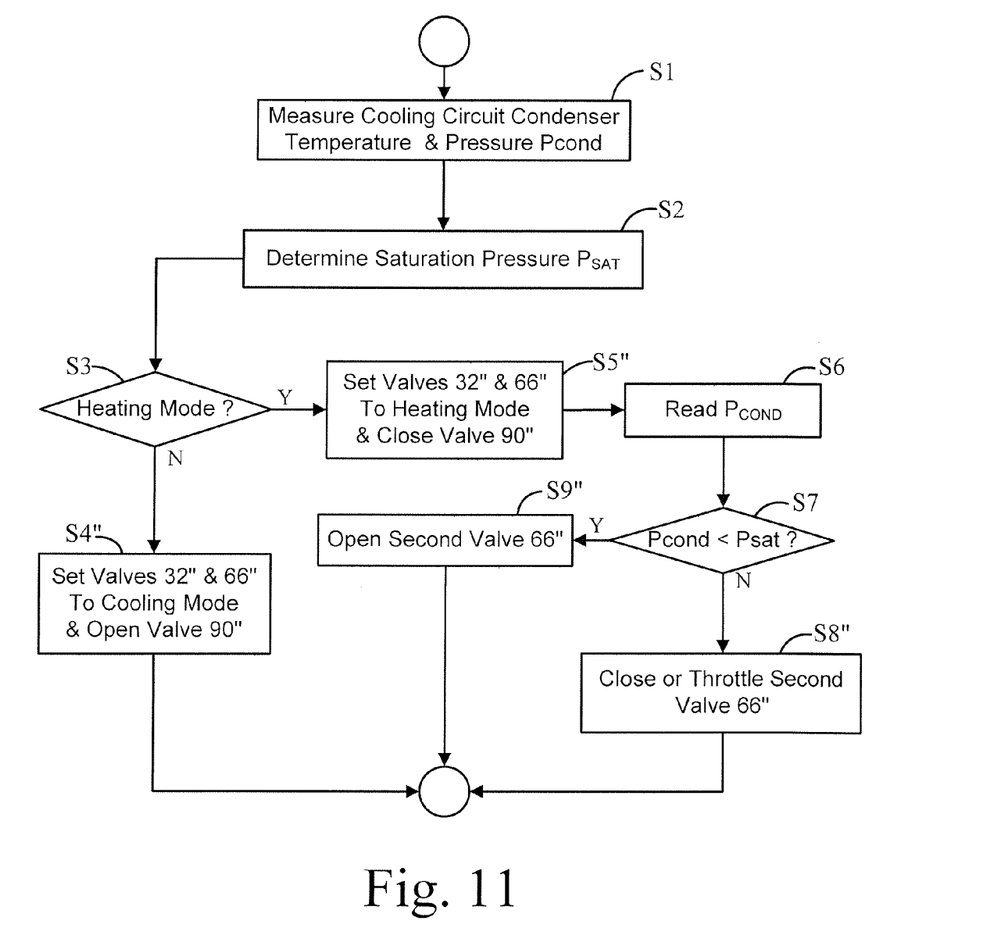
FIG. 11 is a flowchart showing operational steps performed by a controller of the heat pump system in accordance with the third embodiment.

Referring now to FIGS. 9, 10 and 11, a heat pump system 212 in accordance with a third embodiment will now be explained. In view of the similarity between the first and third embodiments, the parts of the third embodiment that are identical to the parts of the first embodiment will be given the same reference numerals as the parts of the first embodiment. Moreover, the descriptions of the parts of the third embodiment that are identical to the parts of the first embodiment may be omitted for the sake of brevity. The parts of the third embodiment that differ from the parts of the first embodiment will be indicated with a double prime (").

Many of the components of the first embodiment are included in the third embodiment. Specifically, the heat pump system 212 includes the compressor 30 and the controller 38 of the first embodiment. The heat pump system 212 includes a modified first valve 32", a modified cooling circuit 34" and a modified heating circuit 36", when compared to the heat pump system 12 of the first embodiment.

The first valve 32" replaces the first valve 32 of the first embodiment. Like the first valve 32 of the first embodiment, the first valve 32" is configured to switch operation of the heat pump system 212 between operation in a cooling mode (FIG. 9) and a heating mode (FIG. 10). The first valve 32" is fluidly connected to the outlet side 42 of the compressor 30. The first valve 32" is operable to direct the flow of refrigerant from the compressor 30 to either one of the cooling circuit 34" and the heating circuit 36". Additionally, the first valve 32" is fluidly coupled to an accumulator 110, as shown in FIGS. 9 and 10, and described below. The accumulator 110 is basically a small tank that serves as a reservoir for refrigerant drawn out of the modified cooling circuit 34" when the heat pump system 212 is operating in the heating mode, and for refrigerant drawn out of the modified heating circuit 36" when the heat pump system 212 is operating in the cooling mode.

The cooling circuit 34" of the heat pump system 212 is a modification of the cooling circuit 34 of the first embodiment. Specifically, the cooling circuit 34" includes the first condenser 50 and the expansion valve 54 from the first embodiment, but the first evaporator 52 of the first embodiment is replaced with a dual purpose heat exchanger 100. The heat exchanger 100 is configured to serve as a first evaporator in the cooling circuit 34" but also serves as a second condenser in the heating circuit 36".

The heating circuit 36" of the heat pump system 212 is a modification of the heating circuit 36 of the first embodiment. The heating circuit 36" includes the second evaporator 62 and the expansion valve 64 of the first embodiment, but the second condenser 60 has been replaced with the heat exchanger 100.

Further, the heat pump system 212 includes a second valve 66" and a third valve 90" that serves purposes similar to second valve 66 and the third valve 90 of the second embodiment, as described in greater detail below. However, the second valve 66" is located upstream from the accumulator 110 and the inlet side 40 of the compressor 30 and at a downstream junction of the heat exchanger 100 and the second evaporator 62. The third valve 90" is located within the cooling circuit 36" between the first condenser 50 and the heat exchanger 100.

The second valve 66" provides a means for selectively blocking the flow of refrigerant out of the heating circuit 36" such that the compressor 30 can draw refrigerant out of first condenser 50 of the cooling circuit 34", while building up refrigerant pressure in the heating circuit 36". The third valve 90" is located on a downstream side of the first condenser 50, between the first condenser 50 and the heat exchanger 100. The third valve 90" provides a means for sealing off the cooling circuit 34" from the heating circuit 36" during operation in the heating mode.

In the third embodiment, the heat exchanger 100 is a dual purpose device that is employed to reduce the overall number of components in the heat pump system 212. Specifically, the heat exchanger 100 is fluidly connected to both the cooling circuit 34" and the heating circuit 36". In the cooling mode shown in FIG. 9, the first valve 32" is set to a position that directs compressed fluid to the first condenser 50. In the cooling mode, the third valve 90" is opened such that refrigerant flows from the first condenser 50 flows to the expansion valve 54 and the heat exchanger 100 receives expanded (low pressure) refrigerant. Hence, the heat exchanger 100 serves as the first evaporator in the cooling circuit 34".

In the heating mode shown in FIG. 10, the first valve 32" is set to direct compressed refrigerant from the compressor 30 directly to the heat exchanger 100. The heat exchanger 100 releases heat into the passenger compartment 18. The cooled compressed high pressure refrigerant then flows through the expansion valve 64 such that low pressure refrigerant is fed into the second evaporator 62. Heat exhausting the passenger compartment 18 can then be absorbed by the second evaporator 62. Refrigerant from the second evaporator 62 then flows to the second valve 66" which is set to direct the warmed low pressure refrigerant to the accumulator 110 and then to the compressor 30. In the heating mode, the third valve 90" is closed.

Hence, the heat exchanger 100 can function as the first evaporator of the cooling circuit 34" and the second condenser of the heating circuit 36". As with the first and second embodiments, the second evaporator 62 of the heating circuit 36" and the first evaporator (the heat exchanger 100) of the cooling circuit 34" are both positioned within the passenger compartment 18.

In the third embodiment, the controller 38 includes operational steps that are similar to those set forth in FIGS. 6 and 8 but that include some modifications, as shown in FIG. 10 and as described below.

FIG. 11 is a flowchart showing one example of control logic implemented by the controller 38 to control the heat pump system 212. Specifically, at step S1, the controller 38 reads the temperature at the first condenser 50 and pressure of the refrigerant within the first condenser 50 from the temperature sensor $T_S$ and the pressure sensor $P_S$. At step S2, the controller 38 then determines the saturation pressure $P_{SAT}$ of the refrigerant within the first condenser 50 based upon the measured temperature and pressure from the temperature sensor $T_S$ and the pressure sensor $P_S$.

At step S3 in FIG. 11, the controller 38 determines whether or not the heat mode has been requested by an occupant of the vehicle 10. If the heat mode has not been requested, then operation moves to step S4". If the heat mode has been requested, operation moves to step S5". At step S4", the controller 38 sets the first, second and third valves 32", 66" and 90" for operation in the cooling mode, as shown in FIG. 9. Specifically, the controller 38 sets the first valve 32" to direct compressed refrigerant to flow from the outlet side 42 of the compressor 30 to the first condenser 50 of the cooling circuit 34". Additionally, in the cooling mode position, the first valve 32" can direct refrigerant from the heat exchanger 100 remaining in the heating circuit 36" to the accumulator 110 (and the compressor 30). Alternatively, the first valve 32" can be configured to block flow between the heat exchanger 100 and the accumulator 110 in the cooling mode. However, in the depicted embodiment, the first valve 32" is set to direct refrigerant flow from the heat exchanger 100 to the accumulator 110 in the cooling mode.

At step S4", the controller 38 also sets the second valve 66" to direct refrigerant flow from the heat exchanger 100 to the accumulator 110. In this setting, the second valve 66" also blocks refrigerant flow from the second evaporator 62 to the accumulator 110 (and the compressor 30). The heating circuit 36" is partially sealed off from the cooling circuit 34" in the cooling mode. Further, in step S4", the controller 38 opens the third valve 90" or maintains the third valve 90" in an open position, if it is already open. Since operation in the cooling mode includes conventional operation of the compressor 30, further description of the cooling mode is omitted for the sake of brevity.

At step S5", the controller 38 sets the first, second and third valves 32", 66" and 90" for operation in the heating mode, as shown in FIG. 10. Specifically, the controller 38 sets the first valve 32" to direct flow of compressed refrigerant from the outlet side 42 of the compressor 30 to the heat exchanger 100 (the second condenser) of the heating circuit 36" and directs refrigerant from the first condenser 50 remaining in the cooling circuit 34" to the accumulator 110. At step S5", the controller 38 also sets the second valve 66" to direct expanded low pressure refrigerant flowing out of the second evaporator 62 to the accumulator 110. Finally, at step S5", the valve 90" is closed sealing off the cooling circuit 34" from the heating circuit 36" such that refrigerant within the cooling circuit 34" can be drawn out of the cooling circuit 34" by the compressor 30 via the valve 32" and its fluid connection to the accumulator 110.

At step S6, the controller 38 reads the current refrigerant pressure $P_{COND}$ as currently measured by the pressure sensor $P_S$ in the first condenser 50. At step S7, the controller 38 determines whether or not the refrigerant pressure $P_{COND}$ is less than the saturation pressure $P_{SAT}$ determined in step S2.

At step S7, if the controller 38 determines that the refrigerant pressure $P_{COND}$ is not less than the saturation pressure $P_{SAT}$ determined in step S2, operation moves to step S8". If the measured refrigerant pressure $P_{COND}$ in the first condenser 50 is less than the determined saturation pressure $P_{SAT}$, then operation moves to step S9".

As step S8", the second valve 66 is either completely closed or throttled to restrict or limit flow of refrigerant flowing from the second evaporator 62 and into the inlet side 40 of the compressor 30 via the accumulator 110. Thus the compressor 30 draws refrigerant out of the first condenser 50 of the cooling circuit 34" via the fluid connection established by the first valve 32" between the first condenser 50 and the accumulator 110. When the flow of refrigerant from the second evaporator 62 is prevented or restricted by closing of the second valve 66" by the controller 38, the compressor 30 draws refrigerant out of the cooling circuit 34". Since the first valve 32" is set to allow the flow of refrigerant to the compressor 30 from the first condenser 50, refrigerant is effectively drawn out of the cooling circuit 34". At the same time, refrigerant pressure builds up in the heating circuit 36" with the temporary closing of the second valve 66".

At step S9", the controller 38 sets the second valve 66" to the heating mode position allowing refrigerant flow out of the second evaporator 62 to the accumulator 110 and the compressor 30.

In an alternate configuration, the expansion valve 54 and the third valve 90" can be replaced with a single, dual purpose valve that serves as both and open and shut valve and an expansion valve that throttles the flow of refrigerant such that the heat exchanger 100 receives low pressure refrigerant.

In still another alternative configuration, the function of first valve 32" can be provided with an additional setting in which the flow of refrigerant to and from an inlet side of the first condenser 50 is completely blocked, but still allows compressed refrigerant to flow from the outlet side 42 of the compressor 30 to the heat exchanger 100, with the heat pump system 212 operating in the heating mode. This additional setting provides isolation of the first condenser 50 from the heating circuit 36".

The controller 38 in all embodiments preferably includes a microcomputer with a heat pump control program that controls the heat pump system 12, as discussed below. The controller 38 can also include other conventional components such as an input interface circuit, an output interface circuit, and storage devices such as a ROM (Read Only Memory) device and a RAM (Random Access Memory) device. The microcomputer of the controller 38 is programmed to control the heat pump system 12. The memory circuit stores processing results and control programs such as ones for heat pump system operation that are run by the processor circuit. The controller 38 is operatively coupled to the various components of the heat pump system 12 in a conventional manner. The internal RAM of the controller 38 stores statuses of operational flags and various control data. The internal ROM of the controller 38 stores the data, such as saturation tables and control codes, for various operations. The controller 38 is capable of selectively controlling any of the components of the control system of the heat pump system 12 in accordance with the control program. It will be apparent to those skilled in the art from this disclosure that the precise structure and algorithms for the controller 38 can be any combination of hardware and software that will carry out the functions of the present invention.

The various components, such as the compressor 30 of the heat pump system 12 are conventional components that are well known in the art. Since these components are well known in the art, these structures will not be discussed or illustrated in detail herein. Rather, it will be apparent to those skilled in the art from this disclosure that the components can be any type of structure and/or programming that can be used to carry out the present invention.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiments the following directional terms "forward", "rearward", "above", "downward", "vertical", "horizontal", "below" and "transverse" as well as any other similar directional terms refer to those directions of a vehicle equipped with the heat pump system 12. Accordingly, these terms, as utilized to describe the present invention should be interpreted relative to a vehicle equipped with the heat pump system 12.

The term "detect" as used herein to describe an operation or function carried out by a component, a section, a device or the like includes a component, a section, a device or the like that does not require physical detection, but rather includes determining, measuring, modeling, predicting or computing or the like to carry out the operation or function.

The term "configured" as used herein to describe a component, section or part of a device includes hardware and/or software that is constructed and/or programmed to carry out the desired function.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such features. Thus, the foregoing descriptions of the embodiments according to the present invention are provided for illustration only, and not for the purpose of limiting the invention as defined by the appended claims and their equivalents.

What is claimed is:
1. A vehicle heat pump system comprising:
  a compressor including an inlet side and an outlet side;
  a first valve fluidly coupled to the outlet side of the compressor to receive compressed refrigerant exiting the outlet side of the compressor;
  a cooling circuit being fluidly coupled between the first valve and the inlet side of the compressor;
  a heating circuit fluidly coupled between the first valve and the inlet side of the compressor, the heating circuit including a heating circuit evaporator, the heating circuit further including a second valve located between the heating circuit evaporator and the inlet side of the compressor, the first valve being configured to switch direction of flow of compressed refrigerant exiting the compressor between flowing to the cooling circuit establishing a cooling mode and flowing to the heating circuit establishing a heating mode, the second valve being configured to switch between an open state and a closed state such that in the open state refrigerant within the heating circuit flows to the inlet side of the compressor and in the closed state refrigerant within the heating circuit is prevented from flowing to the inlet side of the compressor; and
  a controller operatively coupled to the first and second valves, the controller being configured to switch the first valve to block refrigerant flow to the heating circuit and direct refrigerant flow to the cooling circuit to establish the cooling mode,
  the controller being configured to switch the first valve to block refrigerant flow to the cooling circuit and direct refrigerant flow to the heating circuit to establish the heating mode, and the controller being further configured such that while operating in the heating mode the controller cycles the second valve between the open state where refrigerant flows from the heating circuit to the inlet of the compressor and the closed state where the second valve blocks refrigerant flow from the heating circuit to the inlet side of the compressor, such that with the second valve in the closed state the compressor draws refrigerant out of the cooling circuit and refrigerant pressure builds up within the heating circuit, and
  the controller being further configured to maintain the second valve in the open state upon the controller determining that sufficient refrigerant has been drawn out of the cooling circuit during the cycling of the second valve while operating in the heating mode.

2. The vehicle heat pump system according to claim 1, wherein
  the cooling circuit includes a cooling circuit condenser and a cooling circuit evaporator.

3. The vehicle heat pump system according to claim 1, further comprising
  a vehicle having a vehicle structure and a passenger compartment within the vehicle structure, the heating circuit evaporator being positioned within the passenger compartment, and
  the heating circuit includes a heating circuit condenser that is also positioned within the passenger compartment.

4. The vehicle heat pump system according to claim 3, wherein
  the heating circuit evaporator includes a blower motor configured to force airflow across heat exchanging surfaces of the heating circuit evaporator and direct airflow out of the passenger compartment.

5. The vehicle heat pump system according to claim 1, wherein
  the heating circuit evaporator includes a blower motor configured to force airflow across heat exchanging surfaces of the heating circuit evaporator.

6. The vehicle heat pump system according to claim 1, wherein
the cooling circuit includes a cooling circuit evaporator and a cooling circuit condenser, and
the heating circuit is fluidly coupled to the cooling circuit evaporator such that while the first valve is operated to establish the heating mode, the cooling circuit evaporator operates as a heating circuit condenser in the heating circuit.

7. The vehicle heat pump system according to claim 6, further comprising
a vehicle having a vehicle structure and a passenger compartment within the vehicle structure, the heating circuit evaporator and the cooling circuit evaporator both being positioned within the passenger compartment, and the cooling circuit condenser being positioned within the vehicle structure outside of the passenger compartment.

8. The vehicle heat pump system according to claim 7, wherein
the heating circuit evaporator includes a blower motor configured to force airflow across heat exchanging surfaces of the heating circuit evaporator and direct airflow from the passenger compartment.

9. The vehicle heat pump system according to claim 6, further comprising
a third valve between the cooling circuit condenser and the cooling circuit evaporator, and
the controller further controlling the first, second and third valves by:
operating the first valve to direct refrigerant flow from the cooling circuit condenser to the inlet side of the compressor while the first valve is operated to establish the heating mode, and
operating the third valve to block flow of refrigerant between the cooling circuit condenser and the cooling circuit evaporator while the first valve is operated to establish the heating mode.

10. A vehicle heat pump system comprising:
a compressor including an inlet side and an outlet side;
a first valve fluidly coupled to the outlet side of the compressor to receive compressed refrigerant exiting the outlet side of the compressor;
a cooling circuit being fluidly coupled between the first valve and the inlet side of the compressor:
a heating circuit fluidly coupled between the first valve and the inlet side of the compressor, the heating circuit including a heating circuit evaporator, the heating circuit further including a second valve located between the heating circuit evaporator and the inlet side of the compressor;
a controller operatively coupled to the first and second valves, the controller controlling the first and second valves by:
operating the first valve to block refrigerant flow to the heating circuit and direct refrigerant flow to the cooling circuit to establish a cooling mode,
operating the first valve to block refrigerant flow to the cooling circuit and direct refrigerant flow to the heating circuit to establish a heating mode,
cycling the second valve between an open state where refrigerant flows from the heating circuit to the inlet of the compressor and a closed state where the second valve blocks refrigerant flow from the heating circuit to the inlet side of the compressor while the first valve is operated to establish the heating mode, such that with the second valve in the closed state the compressor draws refrigerant out of the cooling circuit and refrigerant pressure builds up within the heating circuit, and
maintaining the second valve in the open state upon the controller determining that sufficient refrigerant has been drawn out of the cooling circuit during the cycling of the second valve, and
a third valve located between the cooling circuit evaporator and the inlet side of the compressor, and
the controller is operatively coupled to the third valve, the controller controlling the third valve by:
operating the third valve temporarily to an open state where refrigerant flows from the cooling circuit to the inlet of the compressor while the first valve is operated to establish the heating mode and the second valve is cycling between the open state and the closed state, and
operating the third valve to a closed state isolating the cooling circuit from the heating circuit while the second valve is set to the open state upon the controller determining that sufficient refrigerant has been drawn out of the cooling circuit with the second valve in the closed state.

11. A vehicle including a heat pump system comprising:
a vehicle structure and a passenger compartment within the vehicle structure;
a compressor coupled to the vehicle structure, the compressor including an inlet side and an outlet side;
a first valve fluidly coupled to the outlet side of the compressor to receive compressed refrigerant exiting the outlet side of the compressor;
a cooling circuit being fluidly coupled between the first valve and the inlet side of the compressor to cool the passenger compartment of the vehicle;
a heating circuit fluidly coupled between the first valve and the inlet side of the compressor to heat the passenger compartment of the vehicle, the heating circuit including a heating circuit evaporator positioned to absorb heat from airflow exhausting the passenger compartment, the heating circuit further including a second valve located between the heating circuit evaporator and the inlet side of the compressor, the first valve being configured to switch direction of flow of compressed refrigerant exiting the compressor between flowing to the cooling circuit establishing a cooling mode and flowing to the heating circuit establishing a heating mode, the second valve being configured to switch between an open state and a closed state such that in the open state refrigerant within the heating circuit flows to the inlet side of the compressor and in the closed state refrigerant within the heating circuit is prevented from flowing to the inlet side of the compressor; and
a controller operatively coupled to the first and second valves, the controller being configured to switch the first valve to block refrigerant flow to the heating circuit and direct refrigerant flow to the cooling circuit to establish the cooling mode,
the controller being configured to switch the first valve to block refrigerant flow to the cooling circuit and direct refrigerant flow to the heating circuit to establish the heating mode, and the controller being further configured such that while operating in the heating mode the controller cycles the second valve between an open state where refrigerant flows from the heating circuit to the inlet of the compressor and a closed state where the second valve blocks refrigerant flow from the heating circuit to the inlet side of the compressor, such that with the second valve in the closed state the compressor draws refrigerant out of the cooling circuit and refrigerant pressure builds up within the heating circuit, and the controller being further configured to maintain the second valve in the open state upon the controller determining that sufficient refrigerant has been drawn out of the cooling circuit during the cycling of the second valve while operating in the heating mode.

12. The vehicle including a heat pump system according to claim 11, wherein the cooling circuit includes a cooling circuit condenser located within the vehicle structure outside of the passenger compartment and a cooling circuit evaporator located within the passenger compartment.

13. The vehicle including a heat pump system according to claim 12, wherein the cooling circuit includes a third valve located between the cooling circuit evaporator and the inlet side of the compressor, and the controller is operatively coupled to the third valve, the controller controlling the third valve by:

operating the third valve temporarily to an open state where refrigerant flows from the cooling circuit to the inlet of the compressor while the first valve is operated to establish the heating mode and the second valve is cycling between the open state and the closed state, and operating the third valve to a closed state isolating the cooling circuit from the heating circuit while the second valve is set to the open state upon the controller determining that sufficient refrigerant has been drawn out of the cooling circuit with the second valve in the closed state.

14. The vehicle including a heat pump system according to claim 11, wherein the heating circuit includes a heating circuit condenser, with the heating circuit condenser and heating circuit evaporator being positioned within the passenger compartment.

15. The vehicle including a heat pump system according to claim 14, wherein the heating circuit evaporator includes a blower motor configured to force airflow across heat exchanging surfaces of the heating circuit evaporator and direct airflow out of the passenger compartment.

16. The vehicle including a heat pump system according to claim 11, wherein the heating circuit evaporator includes a blower motor configured to force airflow across heat exchanging surfaces of the heating circuit evaporator and direct airflow out of the passenger compartment.

17. The vehicle including a heat pump system according to claim 11, wherein the cooling circuit includes a cooling circuit evaporator located within the passenger compartment, and the heating circuit is fluidly coupled to the cooling circuit evaporator such that while the first valve is operated to establish the heating mode, the cooling circuit evaporator operates as a heating circuit condenser in the heating circuit.

18. The vehicle including a heat pump system according to claim 17, wherein the heating circuit evaporator and the cooling circuit evaporator of the cooling circuit are both positioned within the passenger compartment.

19. The vehicle including a heat pump system according to claim 17, further comprising a third valve between the cooling circuit condenser and the cooling circuit evaporator, and the controller further controlling the first, second and third valves by:

operating the first valve to direct refrigerant flow from the cooling circuit condenser to the inlet side of the compressor while the first valve is operated to establish the heating mode, and operating the third valve to block flow of refrigerant between the cooling circuit condenser and the cooling circuit evaporator while the first valve is operated to establish the heating mode.

* * * * *